United States Patent [19]

Li et al.

[11] Patent Number: 4,826,922

[45] Date of Patent: May 2, 1989

[54] VINYLIDENE CHLORIDE COPOLYMER COMPOSITIONS

[75] Inventors: George S. Li, Solon; J. Peter Hottois, Pepper Pike; Muyen M. Wu, Hudson; Elmer J. DeWitt, Cuyahoga Falls, all of Ohio

[73] Assignee: The Standard Oil Company, Cleveland, Ohio

[21] Appl. No.: 64,367

[22] Filed: Jun. 22, 1987

[51] Int. Cl.[4] ...................... C08L 27/06; C08L 27/08; C08L 33/12; C08L 33/20

[52] U.S. Cl. .................................... 525/227; 525/230; 525/238; 525/239; 525/241; 525/915

[58] Field of Search ............... 525/227, 230, 238, 239, 525/241, 915

[56] References Cited

U.S. PATENT DOCUMENTS 2,988,530 6/1951 Slocombe et al. .................. 525/238

Primary Examiner—Jacob Ziegler
Attorney, Agent, or Firm—C. S. Lynch; D. J. Untener; L. W. Evans

[57] ABSTRACT

Disclosed are compositions which are blends of vinylidene chloride-vinyl chloride copolymers with certain indene or 3-methylindene containing polymers.

2 Claims, No Drawings

VINYLIDENE CHLORIDE COPOLYMER COMPOSITIONS

This invention relates to new compositions of vinylidene chloride copolymers with vinyl chloride compounded with indene-containing polymers. Such new compositions have suprisingly greatly increased flexural modulus without significant decrease in tensile strength or flexural strength, the latter properties sometimes also being significantly improved.

It is an object of the invention to provide vinylidene chloride-vinyl chloride polymer compounds having enhanced mechanical physical properties.

Other objects, as well as aspects, features and advantages of the invention, will become apparent from a study of the specification, including the examples and the claims.

According to the present invention there is provided a homogeneous composition containing (A) A first addition copolymer of vinylidene chloride and vinyl chloride containing 8-25 parts by weight vinyl chloride combined in the polymer structure per 100 parts by weight vinylidene chloride plus vinyl chloride combined in said polymer structure, and (B) A second addition copolymer of (1) 10-75 weight percent of one or both of indene and 2-methylindene, (2) 0-50 weight percent of one or both of acrylonitrile and methacrylonitrile, (3) 0-65 weight percent of one or both of styrene and α-methylstyrene and (4) 0-85 weight percent methyl methacrylate combined in the structure, said second addition copolymer containing collectively at least 10 weight percent of one or more of acrylonitrile, methacrylonitrile and methyl methacrylate combined in said polymer structure.

wherein the weight ratio of (A) to (B) is in the range from 19:1 to 3:2, usually in the range from 17:1 to 7:3.

The novel compositions of the invention can be used to mold single or multi-layered films by known extrusion blow molding technique to make films for packaging having good barrier properties, or by injection molding a parison followed by blow molding, high barrier containers can be made having improved stiffness compared to containers made from uncompounded vinylidene chloride-vinyl chloride polymers.

The properties of the vinylidene chloride-vinyl chloride copolymer compositions were determined by the procedures of the following ASTM designations Tensile strength ASTM 638 (modified)
Flexural strength ASTM 790
Flexural modulus ASTM 790

In the blends of the following examples, the vinylidene chloride-vinyl chloride copolymer used was Saran 502, sold by Dow Chemical Company, an injection grade resin having a specific gravity of 1.64. When compounded with 3 parts by weight for 100 parts polymer of Thermolite 813, a thermal stabilizer having the formula

$((C_8H_{17})_2SnC_4H_2O_4)_n$, di-n-octyltin maleate polymer sold M&T Chemicals Inc. per 100 parts of Saran 502, the unblended polymer had the following properties:
Flexural strength 2760 psi
Flexural modulus 65600 psi
Tensile strength 2530 psi The test samples of the blends of the specific examples contained the same amount of this stabilizer per 100 parts by weight of the polymer blend.

The compounded mixtures in the specific examples were made by mixing powders of the two polymers and then blending on a heated two-roll mill at about 152° C., in the ratio of 20 weight parts of the indene or 3-methylidene containing polymers to 80 weight parts of the vinylidene chloride vinyl chloride copolymer. The blends were then compression molded into plaques at about 165° C., and these were then cut into shapes for the various physical tests.

EXAMPLE 1

A copolymer was made by emulsion polymerization according to the following recipe. Amounts are in weight parts per 100 parts of total monomers.

| PHM | Components |
| --- | --- |
| 200 | $H_2O$ |
| 3.0 | Sodium lauryl sulfate |
| 1.0 | $Na_2S_2O_8$ |
| 1.0 | $Na_3PO_4.12H_2O$ |
| 32 | Acrylonitrile |
| 68 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 24 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 58 percent yield. Its composition, as determined by nitrogen analysis, was 34 acrylonitrile, 66 indene in weight percent.

EXAMPLE 2

A copolymer was made by emulsion polymerization according to the following recipe. Amounts are in weight parts per 100 parts of total monomers.

| PHM | Components |
| --- | --- |
| 200 | $H_2O$ |
| 3.0 | Sodium lauryl sulfate |
| 0.7 | $Na_2S_2O_8$ |
| 1.0 | $Na_3PO_4.12H_2O$ |
| 37 | Methacrylonitrile |
| 63 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 22.5 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 20 percent yield. Its composition, as determined by nitrogen analysis, was 46 methacrylonitrile, 54 indene in weight percent.

EXAMPLE 3

A terpolymer was made by emulsion polymerization using the following recipe. Amounts are in weight parts per 100 parts of total monomers.

| Water | 200 |
|---|---|
| Sodium Lauryl Sulfate | 2.5 |
| Sodium Phosphate 12H$_2$O | 1.0 |
| Methyl Methacrylate | 80 |
| Indene | 15 |
| Acrylonitrile | 5 |
| Sodium Persulfate | 0.5 |

The reactor was charged with the ingredients listed above, purged with nitrogen and sealed. The reactor was then mechanically agitated and heated to 60° C. and held at 60° C. for 16 hours. The polymer was recovered by freeze coagulation followed by washing with methanol and drying. The yield of polymer was 90%. The composition of polymer was 3% acrylonitrile, 14% indene and 83% methyl methacrylate as determined by C$^{13}$ NMR.

EXAMPLE 4

A terpolymer was made by suspension polymerization according to the following recipe. Amounts are in weight parts per 100 parts of total monomers

| PHM | Components |
|---|---|
| 200 | H$_2$O |
| 0.6 | 2,2'-azobis(2,4-dimethylvaleronitrile) |
| 0.2 | hydroxylethylcellulose (suspending agent) |
| 20 | Acrylonitrile |
| 20 | Methyl Methacrylate |
| 60 | Indene |

200 parts by weight of distilled water, 0.2 parts of HEC (which had been dissolved in part of the water), 0.2 parts of 2,2'-azobis(2,4-dimethylvaleronitrile), 20 parts of Acrylonitrile, 2 parts of methyl methacrylate, and 60 parts of indene were charged into reactor provided with a stirrer. The reactor was purged with nitrogen, and was kept under nitrogen pressure, The temperature of the reactor was held for 5 minutes at 68° C. with stirring; then a monomer mixture comprising 0.4 parts of 2,2'-azobis(2,4-dimethylvaleronitrile) and 18 parts of methyl methacrylate was added continually into the reactor over a period of about 10 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum over for 24 hours at 60° C. A powdery terpolymer was obtained in a 34.0% yield. The composition of the polymer was 26.6 acrylonitrile, 19.6 methyl methacrylate and 53.8 indene as determined by C$^{13}$ NMR and nitrogen analysis.

EXAMPLE 5

A terpolymer was made by emulsion polymerization using the following recipe. Amounts are in weight parts per 100 parts of total monomers.

| Water | 200 |
|---|---|
| Sodium Lauryl Sulfate | 2.5 |
| Sodium Phosphate 12H$_2$O | 1.0 |
| Styrene | 70 |
| Indene | 10 |
| Acrylonitrile | 20 |
| Sodium Persulfate | 0.5 |

The reactor was charged with the ingredients listed above, purged with nitrogen and sealed. The reactor was then mechanically agitated and heated to 60° C. and held at 60° C. for 16 hours. The polymer was recovered by freeze coagulation followed by washing with methanol and drying. The yield of polymer was 88%. The composition of polymer was 12% acrylonitrile, 44% indene and 44% styrene as determined by C$^{13}$ NMR.

EXAMPLE 6

A terpolymer was made by suspension polymerization according to the following recipe. Amounts are in weight parts per 100 parts of total monomers.

| PHM | Components |
|---|---|
| 150 | H$_2$O |
| 0.6 | 2,2'-azobis(2,4-dimethylvaleronitrile) |
| 0.2 | Hydroxylethylcellose (suspending agent) |
| 32 | Acrylonitrile |
| 44 | α-Methylstyrene |
| 24 | Indene |

150 parts by weight of distilled water, 0.2 parts of HEC (which has been dissolved in water), 0.2 parts of 2,2'-azobis(2,4-dimethylvaleronitrile), 32 parts of Acrylonitrile, 20 of α-methylstyrene and 24 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile) and 24 parts of α-methylstyrene was added continually into the reactor over a period of about 9 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery terpolymer was obtained in a 49 percent yield. The composition of the polymer in weight percent was 25 acrylonitrile, 63 α-methylstyrene and 12 indene as determined by C$_{13}$ NMR.

EXAMPLE 7

A copolymer was made by emulsion polymerization according to the following recipe. Amounts are in weight parts per 100 parts of total monomers.

| PHM | Components |
|---|---|
| 200 | H$_2$O |
| 3.0 | Sodium lauryl sulfate |
| 1.92 | Na$_2$S$_2$O$_8$ |

| PHM | Components |
|---|---|
| 1.0 | Na$_3$PO$_4$·12H$_2$O |
| 29 | Acrylonitrile |
| 71 | 3-Methylindene |

200 parts by weight of distilled water, 3.0 parts of sodium lauryl sulfate, 1.0 part of Na$_3$PO$_4$·12H$_2$O, 18 parts of acrylonitrile, 71 parts of 3-methylindene and 0.6 parts of Na$_2$S$_2$O$_8$ were charged into a reactor provided with a stirrer. The reactor was purged with nitrogen, and was kept under nitrogen pressure. The temperature of the reactor was held at 75° C. with stirring. After 2, 4, 5.5 and 7 hrs additional increments of 0.2, 0.2, 0.2 and 0.72 parts, respectively, of Na$_2$S$_2$O$_8$ were added into the reactor for maintaining the reaction rate. The resulting mixture was allowed to react for 3.0 more hours afer the incremental additions. After completion of the reaction, the polymer was recovered through freeze coagulation of the latex. The polymer was filtered, and was then stirred with excess methanol overnight to remove residual monomers. The polymer was filtered again and dried in a vacuum oven for 24 hours at 60° C. A powdery copolymer was obtain in an 88 percent yield. Its composition, as determined by gas chromatograph analysis of residual monomers and the yield, was 30 acrylonitrile and 70 3-methylindene, all in weight percent. The inherent viscosity was 0.097.

EXAMPLE 8

A terpolymer was made by emulsion polymerization according to the following recipe. Amounts are in weight parts per 100 parts of total monomers.

| PHM | Components |
|---|---|
| 200 | H$_2$O |
| 3.0 | Sodium lauryl sulfate |
| 1.2 | Na$_2$S$_2$O$_8$ |
| 1.0 | Na$_3$PO$_4$·12H$_2$O |
| 25 | Acrylonitrile |
| 20 | Methyl Methacrylate |
| 55 | 3-Methylindene |

200 parts by weight of distilled water, 3.0 parts of sodium lauryl sulfate, 1.0 part of Na$_3$PO$_4$·12H$_2$O, 18 parts of acrylonitrile, 12 parts of methyl methacrylate, 55 parts of 3-methylindene and 0.5 parts of Na$_2$S$_2$O$_8$ were charged into a reactor provided with a stirrer. The reactor was purged with nitrogen, and was kept under nitrogen pressure. The temperature of the reactor was held at 75° C. for 1 hour with stirring; then a monomer mixture comprising 7 parts acrylonitrile and 8 parts of methyl methacrylate was incrementally added in portions into the reactor once every hour over a period of 5 hours through a syringe pump. After 2, 4, and 5 hrs additional increments of 0.25, 0.25 and 0.2 parts, respectively, of Na$_2$S$_2$O$_8$ were added into the reactor for maintaining the reaction rate. The resulting mixture was allowed to react for 3.0 more hours after the incremental additions. After completion of the reaction, the polymer was recovered through freeze coagulation of the latex. The polymer was filtered, and was then stirred with excess methanol overnight to remove residual monomers. The polymer was filtered again and dried in a vacuum oven for 24 hours at 60° C. A powdery terpolymer was obtained in a 53.7 percent yield. Its composition, as determined by gas chromatograph analysis of residual monomers and the yield, was 25 acrylonitrile, 20 methyl methacrylate, 55 3-methylindene, all in weight percent. The inherent viscosity was 0.124.

EXAMPLE 9

A terpolymer was made by emulsion polymerization according to the following recipe. Amounts are in weight parts per 100 parts of total monomers.

| PHM | Components |
|---|---|
| 200 | H$_2$O |
| 3.0 | Sodium lauryl sulfate |
| 1.2 | Na$_2$S$_2$O$_8$ |
| 1.0 | Na$_3$PO$_4$·12H$_2$O |
| 30 | Acrylonitrile |
| 35 | α-Methylstyrene |
| 35 | 3-Methylindene |

200 parts by weight of distilled water, 3.0 parts of sodium lauryl sulfate, 1.0 parts of Na$_3$PO$_4$·12H$_2$O, 30 parts of acrylonitrile, 35 parts of α-methylstyrene, 35 parts of 3-methylindene and 0.6 parts of Na$_2$S$_2$O$_8$ were charged into a reactor provided with a stirrer. The reactor was purged with nitrogen, and was kept under nitrogen pressure. The temperature of the reactor was held at 75° C. with stirring. After 3 hours and after 5 hours, an additional 0.3 parts of Na$_2$S$_2$O$_8$ was added into the reactor for maintaining the reaction rate. The resulting mixture was allowed to react for 1.5 more hours after the incremental additions of Na$_2$S$_2$O$_8$. After completion of the reaction, the polymer was recovered through freeze coagulation of the latex. The polymer was filtered, and was then stirred with excess methanol overnight to remove residual monomers. The polymer was filtered again and dried in a vacuum oven for 24 hours at 60° C. A powdery terpolymer was obtain in an 52.4 percent yield. Its composition, as determined by gas chromatograph analysis of residual monomers and the yield, was 30 acrylonitrile, 35 α-methylstyrene and 35 3-methylindene, all in weight percent. The inherent viscosity was 0.218.

EXAMPLE 10

A tetrapolymer was made by emulsion polymerization according to the following recipe. Amounts are in weight parts per 100 parts of total monomers.

| PHM | Components |
|---|---|
| 200 | H$_2$O |
| 3.0 | Sodium lauryl sulfate |
| 1.2 | Na$_2$S$_2$O$_8$ |
| 1.0 | Na$_3$PO$_4$·12H$_2$O |
| 25 | Acrylonitrile |
| 20 | Methyl Methacrylate |
| 30 | α-Methylstyrene |
| 25 | 3-methylindene |

200 parts by weight of distilled water, 3.0 parts of sodium lauryl sulfate, 1.0 part of Na$_3$PO$_4$·12H$_2$O, 18 parts of acrylonitrile, 12 parts of methyl methacrylate, 9 parts of α-methylstyrene, 25 parts of 3-methylindene and 0.5 parts of Na$_2$S$_2$O$_8$ were charged into a reactor provided with a stirrer. The reactor was purged with nitrogen, and was kept under nitrogen pressure. The temperature of the reactor was held at 75° C. for 1 hour with stirring; then a monomer mixture comprising 7 parts of acrylonitrile, 8 parts of methyl methacrylate and 21 parts of α-methylstyrene was incrementally added in portions into the reactor once every hour over a period of 5 hours through a syringe pump. After 2.5 hours an additional 0.25 parts of Na₂S₂O₈, after 4¼ hours an additional 0.25 parts and after 6 hours an additional 0.20 parts of Na₂S₂O₈ were added into the reactor for maintaining the reaction rate. The resulting mixture was allowed to react for 1.5 more hours after the incremental additions. After completion of the reaction, the polymer was recovered through freeze coagulation of the latex. The polymer was filtered, and was then stirred with excess methanol overnight to remove residual monomers. The polymer was filtered again and dried in a vacuum oven for 24 hours at 60° C. A powdery tetrapolymer was obtain in an 92 percent yield. Its composition, as determined by gas chromatograph analysis of residual monomers and the yield, was 26 acrylonitrile, 19 methyl methacrylate, 32 $\alpha$-methylstyrene and 23 3-methylindene, all in weight percent.

EXAMPLE 11

A copolymer was made by emulsion polymerization according to the following recipe. Amounts are in weight parts per 100 parts of total monomers.

| PHM | Components |
|---|---|
| 200 | $H_2O$ |
| 3.0 | Sodium lauryl sulfate |
| 1.0 | $Na_2S_2O_8$ |
| 1.0 | $Na_3PO_4 \cdot 12H_2O$ |
| 80 | Methyl Methacrylate |
| 20 | Indene |

The sodium lauryl sulfate and the sodium phosphate were dissolved in water and charged to the reactor. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 16 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 94 percent yield. Its composition, as determined by nitrogen analysis, was 86 methyl methacrylate and 14 indene in weight percent.

EXAMPLE 12

A tetrapolymer was made by emulsion polymerization according to the following recipe in which amounts are shown in weight parts per 100 total parts of the monomers:

| Water | 200 |
|---|---|
| Acrylonitrile | 25 |
| Methyl Methacrylate | 20 |
| $\alpha$-Methylstyrene | 30 |
| Indene | 25 |
| $Na_3PO_4 \cdot 12H_2O$ | 1 |
| Sodium Persulfate | 1.2 |
| Sodium Lauryl Sulfate | 3 |

Sodium lauryl sulfate and the sodium phosphate were dissolved in water and charged to the reactor fitted with a cooling condenser. The reactor contents were placed under a nitrogen atmosphere. The reactor was charged with a monomer mixture consisting of 20 phm acrylonitrile, 15 phm methyl methacrylate, 10 phm $\alpha$-methylstyrene and 25 phm indene. The contents of the reactor were heated to 75° C. and agitated with a mechanical stirrer.

Polymerization was initiated by adding 0.7 phm $Na_2S_2O_8$. A monomer mixture consisting of 5 phm acrylonitrile, 5 phm methyl methacrylate and 20 phm $\alpha$-methylstyrene was introduced in measurements starting at 1 hour after the beginning of polymerization. The exact amounts were as follows:

| 1 hour | 20% |
|---|---|
| 2 hours | 20% |
| 3 hours | 20% |
| 4 hours | 20% |
| 5 hours | 20% |

In addition, 0.3 phm and 0.2 phm of additional $Na_2S_2O_8$ was added at 3 hours and 5 hours, respectively.

After 6 hours the polymerization reached a monomer conversion of 88.7 percent as determined by the solids measurements. Its inherent viscosity was 0.228. Its composition in weight percent was 25 acrylonitrile, 21 methyl methacrylate, 33 $\alpha$-methylstyrene and 21 indene, as measured by gas chromatography analysis of the residual monomers.

The following table shows the physical properties of polymer blend compositions of Examples 1-12:

| Example Number | Flexural Strength, psi | Flexural Modulus, psi | Tensile Strength, psi |
|---|---|---|---|
| 1 | 2613 | 156,000 | 2386 |
| 2 | 2460 | 109,400 | 3550 |
| 3 | 6050 | 181,530 | 6000 |
| 4 | 2460 | 108,000 | 2876 |
| 5 | 4668 | 125,500 | 4509 |
| 6 | 3226 | 147,100 | 3847 |
| 7 | 2538 | 108,700 | 2152 |
| 8 | 2643 | 157,200 | 2135 |
| 9 | 3210 | 167,000 | 2470 |
| 10 | 3994 | 108,400 | 3038 |
| 11 | 5010 | 145,000 | 3940 |
| 12 | 4700 | 151,000 | 3750 |

As will be evident to those skilled in the art various modifications of this invention can be made or followed in the light of the foregoing disclosure and discussion without departing from the spirit and scope of the disclosure or from the scope of the claims.

We claim:
1. A polymer composition containing
   (A) A first addition copolymer of vinylidene chloride and vinyl chloride containing 8-25 parts by weight vinyl chloride combined in the polymer structure per 100 parts by weight vinylidene chloride plus vinyl chloride combined in said polymer structure, and
   (B) A second addition copolymer of (1) 10-75 weight percent of one or both of indene and 3-methylindene, (2) 0-50 weight percent of one or both of acrylonitrile and methacrylonitrile, and (3) 0-65 weight percent of one or both of styrene and $\alpha$-methylstyrene and (4) 0-85 weight percent methyl methacrylate combined in the structure, said second addition copolymer containing collectively at least 10 weight percent of one or more of acryloni- trile, methacrylonitrile and methyl methacrylate combined in said polymer structure.

wherein the weight ratio of (A) to (B) is in the range from 19:1 to 3:2.

2. A polymer composition containing
(A) A first addition copolymer of vinylidene chloride and vinyl chloride containing 8-25 parts by weight vinyl chloride combined in the polymer structure per 100 parts by weight vinylidene chloride plus vinyl chloride combined in said polymer structure, and
(B) A second addition copolymer of (1) 10-75 weight percent of one or both of indene and 3-methylindene, (2) 0-50 weight percent of one or both of acrylonitrile and methacrylonitrile, (3) 0-65 weight percent of one or both of styrene and α-methylstyrene and (4) 0-85 weight percent methyl methacrylate combined in the structure of said second addition copolymer containing collectively at least 10 weight percent of one or more of acrylonitrile, methacrylonitrile and methyl methacrylate combined in said polymer structure, wherein the weight ratio of (A) to (B) is in the range from 17:1 to 7:3.

* * * * *